United States Patent
Miyazaki et al.

(10) Patent No.: US 6,695,026 B2
(45) Date of Patent: Feb. 24, 2004

(54) PNEUMATIC TIRE

(75) Inventors: Shinichi Miyazaki, Kobe (JP); Kazumi Yamazaki, Kobe (JP); Osamu Toda, Kobe (JP); Yasuo Sakai, Itami (JP)

(73) Assignees: Sumitomo Rubber Industries, Ltd., Hyogo-ken (JP); Sumitomo Electric Industries, Ltd., Osaka-fu (JP)

( * ) Notice: Subject to any disclaimer, the term of this patent is extended or adjusted under 35 U.S.C. 154(b) by 0 days.

(21) Appl. No.: 09/784,042

(22) Filed: Feb. 16, 2001

(65) Prior Publication Data

US 2001/0027836 A1 Oct. 11, 2001

(30) Foreign Application Priority Data

Feb. 17, 2000 (JP) .......................... 2000-039898

(51) Int. Cl.$^7$ .............................. B60C 9/18; D02G 3/48; D07B 1/06
(52) U.S. Cl. ..................... 152/527; 152/526; 152/451; 57/200; 57/206; 57/227; 57/311; 57/902
(58) Field of Search ................... 152/451, 527, 152/526; 57/200, 206, 212, 223, 227, 241, 242, 311, 902

(56) References Cited

U.S. PATENT DOCUMENTS

| 4,506,500 | A | * | 3/1985 | Miyauchi et al. | ............ 152/451 |
|---|---|---|---|---|---|
| 5,661,966 | A | | 9/1997 | Matsumaru | |
| 5,722,226 | A | * | 3/1998 | Matsumaru | ............... 57/138 |
| 5,772,809 | A | * | 6/1998 | Yanagisawa | ............... 152/451 |
| 5,784,874 | A | * | 7/1998 | Bruyneel et al. | ............. 57/237 |

FOREIGN PATENT DOCUMENTS

| EP | 0 976 583 A | | 2/2000 |
|---|---|---|---|
| JP | 01162885 | * | 6/1989 |
| JP | 09228272 | * | 9/1997 |
| JP | 2000-45819 | * | 2/2000 |

\* cited by examiner

*Primary Examiner*—Jeff H. Aftergut
*Assistant Examiner*—Justin Fischer
(74) *Attorney, Agent, or Firm*—Birch, Stewart, Kolasch & Birch, LLP

(57) ABSTRACT

A pneumatic tire comprises a tread reinforcing belt made of metallic cords, each of the metallic cords is made up of six to twelve metallic filaments whose diameter is not less than 0.15 mm but less than 0.25 mm, the six to twelve metallic filaments are grouped into a plurality of bunches each including two to four filaments, the filaments of each bunch are twisted together at a first twisting pitch, the bunches are twisted together into the cord at a final twist pitch Pc of from 10 to 40 mm, the first twisting pitch is more than the final twist pitch, and the bunches each include at least one waved filament which is two-dimensionally waved at wave pitches Pw in a range of from 5 to 30 times the diameter (d) of the filament and a wave height (h) in a range of from 0.2 to 3.0 times the diameter (d).

14 Claims, 6 Drawing Sheets

PNEUMATIC TIRE

The present application claims priority under 35 U.S.C. § 119 to Japanese Patent Application No. 2000-39898, filed Feb. 17, 2000, the entire contents of which are hereby incorporated by reference.

The present invention relates to a pneumatic tire with a tread reinforcing belt, more particularly to an improved belt being suitable for radial tires for passenger cars.

DESCRIPTION OF BACKGROUND ART

Hitherto, belt cords having a 1×2, 1×3, 1×4 or 2+2 structure made up of two or three or four steel filaments have been widely used in a tread reinforcing belt of a passenger car radial tire because to decrease the number of the filaments by increasing the diameters of steel filaments are favorable for the cost and production efficiency of the cord. However, such a cord structure is not always favorable for ride comfort which became especially important to the recent high-class passenger cars because the bending rigidity of the belt is relatively high due to the relatively large diameter of the steel filaments. If adhesion failure occurs between the steel cords and surround topping rubber and tread rubber due to large difference in stiffness therebetween, a decrease in the cord strength due to corrosion and a resultant decrease in the tread durability tend to be caused. On the other hand, for the steel cords made up of three or four steel filaments, in order to improve rubber penetration into a closed space among the filaments, there has been proposed such a technique that the closed space is opened by waving one or more of the filaments. In such a cord, therefore, the cord diameter inevitably increases and the thickness of the belt ply increases. This is not preferable for the tire weight and belt rigidity.

It is an object of the present invention to provide a pneumatic tire in which ride comfort is improved, and adhesion failure between the belt cords and surrounding rubber can be effectively prevented.

According to the present invention, a pneumatic tire comprises a belt disposed in a tread portion, the belt made of cords each made up of six to twelve metallic filaments whose diameter is not less than 0.15 mm but less than 0.25 mm, the six to twelve metallic filaments being grouped into a plurality of bunches, each bunch including two to four filaments being twisted together into the bunch at a first twist pitch, the bunches being twisted together into the cord at a final twist pitch, the final twist pitch being in a range of from 10 to 40 mm, and the first twist pitch being more than the final twist pitch, and each of the bunch including at least one waved filament which is two-dimensionally waved at wave pitches in a range of from 5 to 30 times the diameter of the filament and at a wave height in a range of from 0.2 to 3.0 times the diameter of the filament.

BRIEF DESCRIPTION OF THE DRAWINGS

Embodiments of the present invention will now be described in detail in conjunction with the accompanying drawings.

DETAILED DESCRIPTION OF THE PREFERRED EMBODIMENTS

Figure 1:
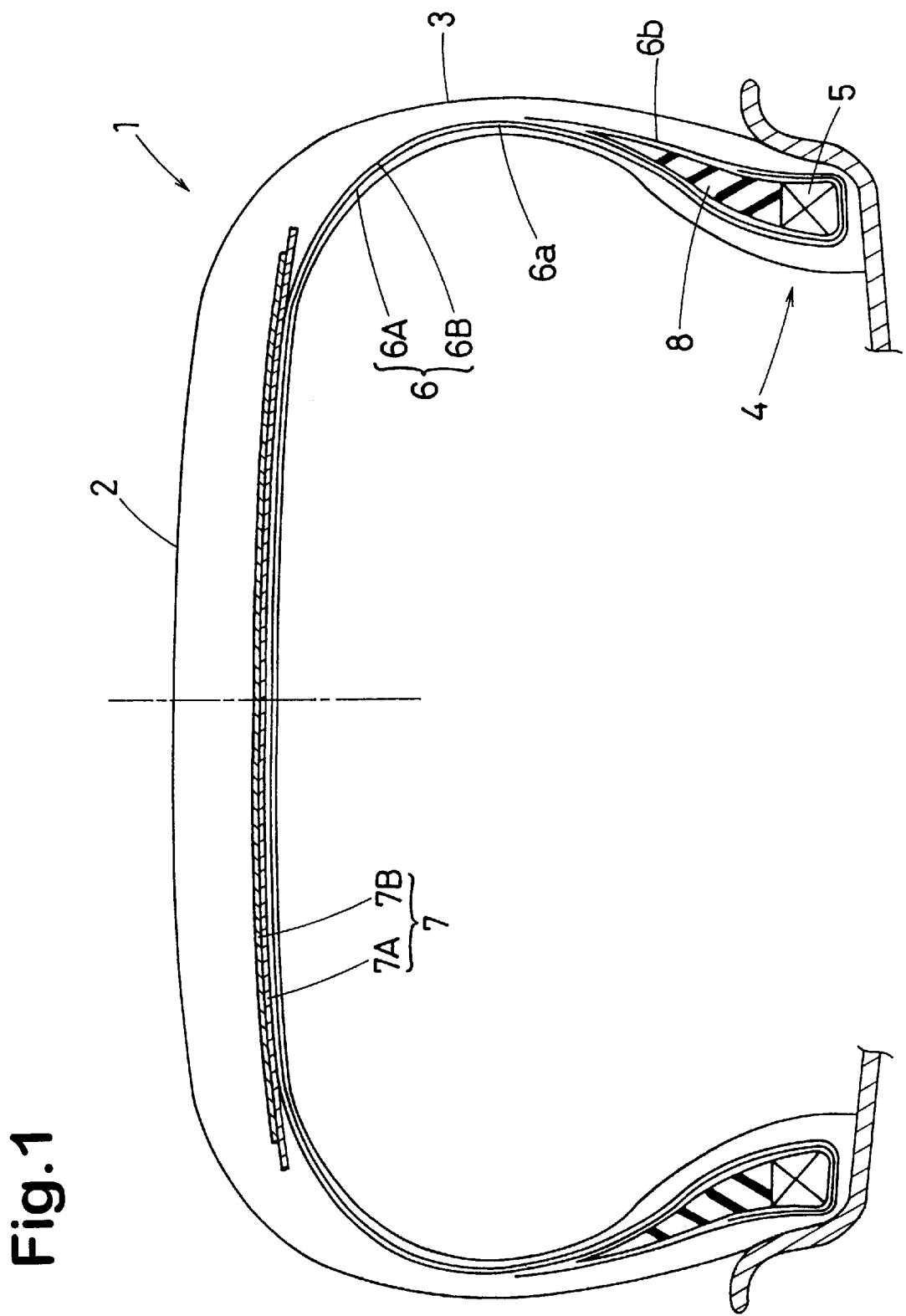
FIG. 1 is a cross sectional view of a radial tire according to the present invention showing an example of the internal tire structure therefor.

In FIG. 1, pneumatic tire 1 according to the present invention has a tread portion 2, a pair of sidewall portions 3 and a pair of bead portions 4 to have a toroidal shape, and the tire 1 is reinforced by a bead core 5 disposed in each of the bead portions 4, a carcass 6 extended between the bead portions 4 and a belt 7 disposed in the tread portion 2.

In this example, the pneumatic tire 1 is a radial tire of size 165/70SR13 for passenger cars.

The carcass 6 comprises at least one ply of cords arranged radially at an angle of from 70 to 90 degrees with respect to the tire equator (thus, radial or semiradial ply) and extending between the bead portions 4 through the tread portion 2 and sidewall portions 3 and turned up around the bead core 5 in each bead portion 4 from the inside to the outside of the tire so as to form a pair of turned up portions 6b and a main portion 6a therebetween. In this example, the carcass 6 is composed of two plies 6A and 6B of organic fiber cords such as polyester, nylon, rayon and the like, which are arranged at about 90 degrees, and each ply is turned up around the bead cores 5.

Between the main portion 6a and turned up portion 6b in each bead portion 4, there is disposed a rubber bead apex 8 extending radially outwardly from the bead core 5 and tapering towards the radially outer end thereof.

The belt 7 is disposed radially outside the carcass 6 and comprises at least two cross plies of rubberized parallel cords which are laid at an angle of from 15 to 35 degrees with respect to the tire equator. In this example, the belt 7 is composed of a radially outer ply 7B and a radially inner ply 7A which is slightly wider than the outer ply 7B.

Incidentally, in order to improve high speed durability of the tread portion, it is possible to further provide a band on the radially outside of the belt 7, wherein the band is made of (i) at least one organic fiber cord wound spirally around the belt or (ii) a strip of rubberized parallel organic fiber cords wound around the belt. In either case (i) or (ii), the band cord angle with respect to the tire equator is substantially zero or very small, for example not more than 5 degrees.

According to the present invention, the belt cords 10 of the belt 7 are made up of six to twelve metallic filaments F whose diameter (d) is not less than 0.15 mm but less than 0.25 mm. The metallic filaments F are grouped into bunches B, each bunch made up of two to four filaments, and the bunches B are twisted together into the cord at a final twist pitch Pc. If the number of the metallic filaments F in each bunch B is five or more, the rubber penetration is liable to become worse. Preferably, each bunch B is made up of two or three metallic filaments F.

Figure 2:
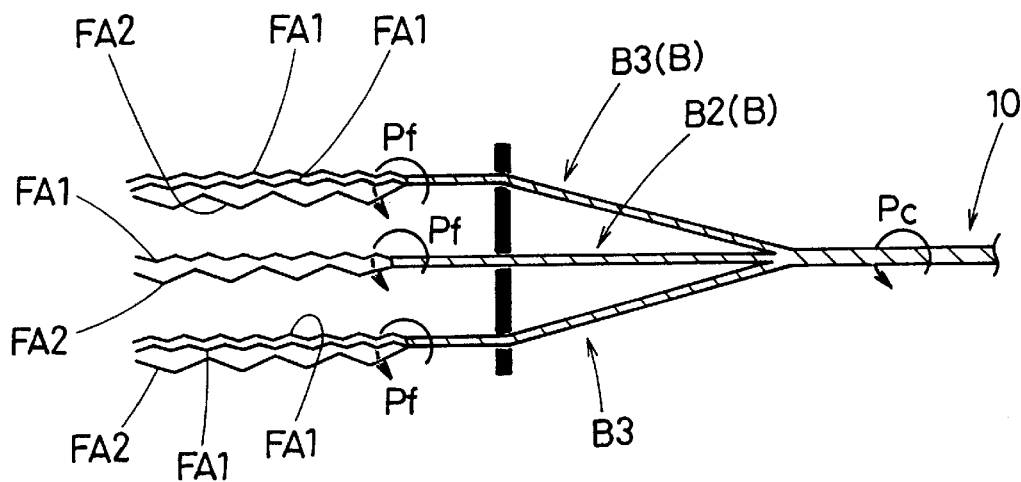
FIG. 2 is a diagram showing a method of making the metallic cord.

As shown in FIG. 2, two to four metallic filaments F for each bunch are first twisted together into the bunch B at a first twist pitch Pf. Then, the bunches B are twist together into the cord at the final twist pitch Pc of from 10 to 40 mm. The first twist pitch Pf is set at a relatively long pitch of from 3 to 20 times the final twist pitch Pc. If the first twist pitch Pf is less than 3 times or more than 20 times the final twist pitch Pc, the rubber penetration decreases.

In this embodiment, the direction of the first twist for the bunches B is the same as the direction of the final twist for the cord. But it may be reversed.

In the present invention, further, each of the bunches B includes at least one waved filament FA. In other words, the bunch B can be made up of (i) a plurality of waved filaments FA only, or (ii) at least one waved filament FA and at least one unwaved filament FB.

Each bunch B can include one or more unwaved filaments FB, for example to control the initial elongation under a light load. In this case, the number of the unwaved filaments FB is preferably limited to a number less than that of the waved filament(s) FA. Incidentally, the unwaved filament FB is straight before being twisted.

The waved filaments FA are two-dimensionally waved before being twisted.

Figure 3:
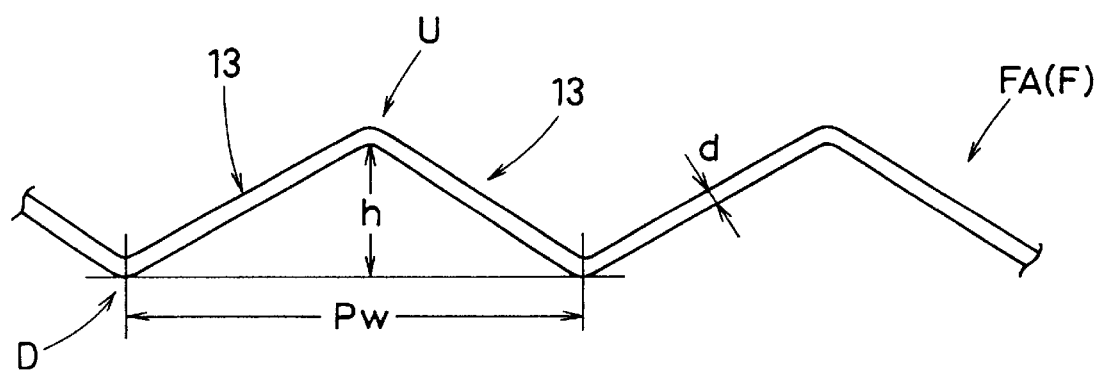
FIG. 3 is a schematic view of an example of the waved filament for explaining the wave pitch and height.

In FIG. 3 showing an example of the waved filament FA, the waveform is a triangular waveform made up of straight segments 13 of substantially the same length. Also, a sawtooth waveform made up of alternate long straight segments and short straight segments and the like can be used. Further, a curved waveform devoid of straight segment such as sinusoidal waveform can be used. But, a waveform including straight segments 13 is preferably used for the rubber penetration into the cord.

The pitch Pw of the two-dimensional wave is set in a range of from 5.0 to 30.0 times, preferably 10.0 to 25.0 times the diameter (d). And the wave height (h) is set in a range of from 0.2 to 3.0 times, preferably 0.5 to 2.0 times the diameter (d). Here, the wave height (h) is defined as the peak-to-peak height of the wave, and the wave pitch Pw is defined as one cycle of the wave as shown in FIG. 3.

Further, it is preferable to limit the value (d×h/Pw) to a range of from 0.014 to 0.028, more preferably 0.020 to 0.025.

As to the material of the filaments F, hard drawn steel wires whose carbon content is 0.65 to 0.88 wt % are preferably used. Preferably, the metallic filaments F are provided on the surface with a coat for improving the adhesion to the surrounding elastomer. For the coat, various resins, metal which acts during vulcanization and the like can be used.

If the diameters (d) of the metallic filaments F are less than 0.15 mm, it is difficult to provide the necessary strength and rigidity for the belt 7. On the other hand, if the diameters (d) are more than 0.25 mm, it is difficult to provide a good ride comfort.

If the wave pitch Pw is less than 5.0 times the diameter (d), the strength of the filament tends to decrease. If more than 30 times, the rubber penetration can not be improved.

If the wave height (h) is less than 0.2 times the diameter (d), it is difficult to improve the rubber penetration. If more than 3.0 times, the strength of the filament tends to decrease.

If the carbon content is less than 0.65 wt %, the strength of the filament tends to be insufficient for the belt cord. If the carbon content is more than 0.88 wt %, the filament decreases in the bending strength.

In the figures, in order to distinguish the waved filament FA and unwaved filament FB from each other, the cross section of the waved filament FA is dotted, and the cross section of the unwaved filament FB is hatched for convenience sake.

Figure 5:
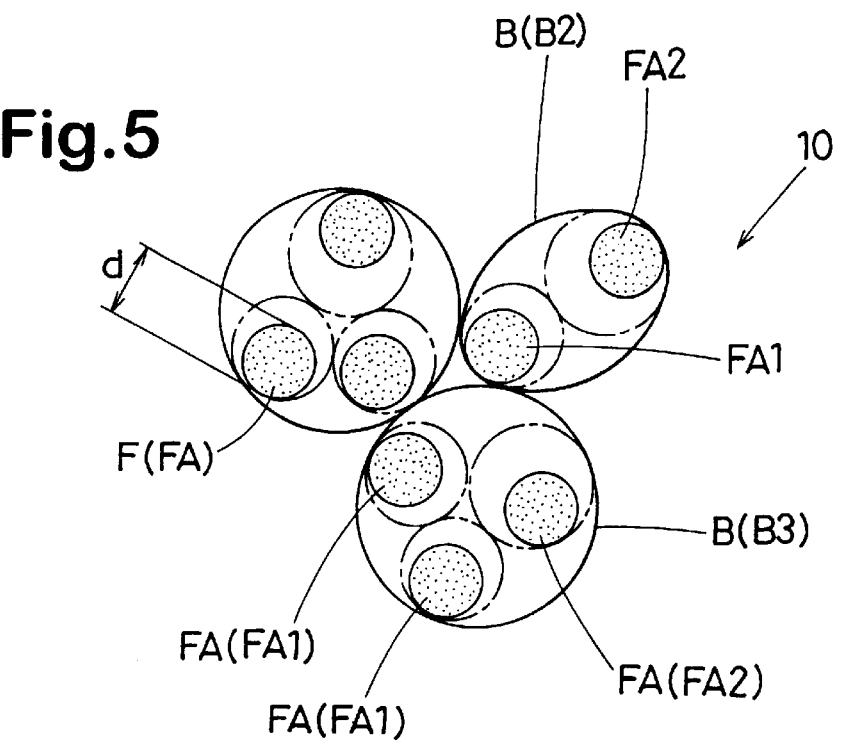
FIG. 5 is a schematic cross sectional view of an example of the belt cord showing an example of the filament arrangement.

FIG. 5 shows an example in which every bunch B is made up of waved filaments FA only. Further, each of the bunches B includes two kinds of waved filaments FA1 and FA2.

In case a bunch B includes two or more waved filaments FA, it is preferable that the waved filaments FA include at least two kinds of waved filaments FA which are different from each other in respect of the wave pitch Pw. It may be possible to change the wave height (h) between the different kinds of waved filaments FA. But, it is preferable not to change the wave height (h), namely, the different kinds of waved filaments FA have substantially the same wave height (h) in order to avoid an excessive decrease of the cord strength. Thereby, the rubber penetration into the cord can be improved although the wave height (h) is relatively low. And unfavorable increasing of the cord diameter can be prevented.

Figure 4:
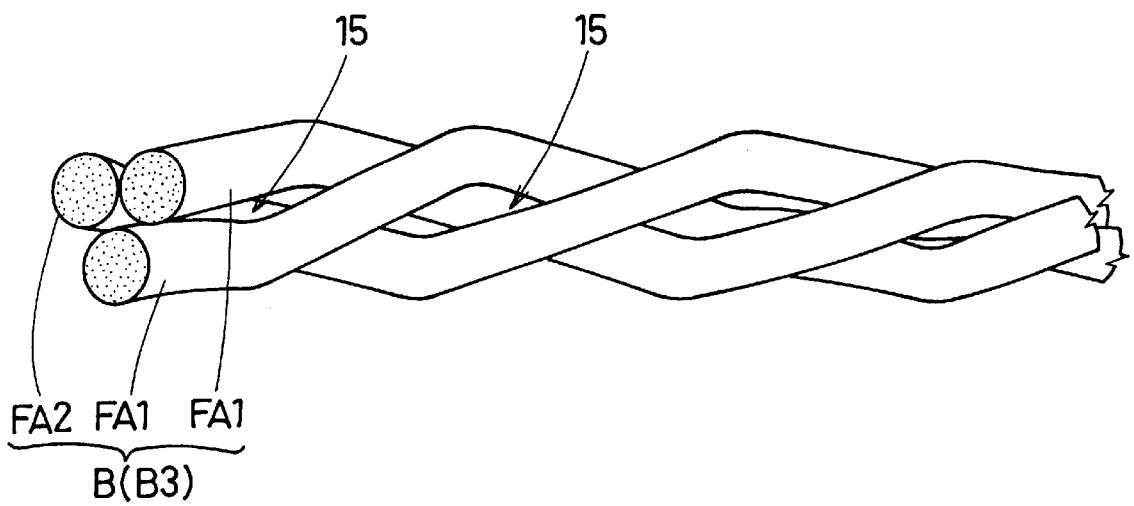
FIG. 4 is a schematic perspective view of a three-filament bunch.

In the example cord 10 shown in FIG. 5, one bunch B2 made up of two metallic filaments F (hereinafter the "two-filament bunch B2") and two bunches B3 each made up of three metallic filaments F (hereinafter the "three-filament bunch B3") are twisted together into the cord at the final twist pitch Pc. In this example, the three-filament bunch B3 is made up of two waved filaments FA1 and one waved filament FA2 as shown in FIG. 4. The two-filament bunch B2 is made up of one waved filament FA1 and one waved filament FA2.

Figure 6A:
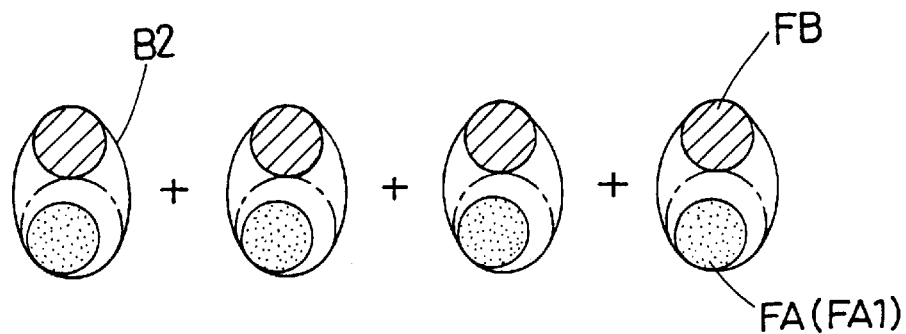
FIGS. 6A, 6B, 6C, 7A, 7B and 8 each show another example of the filament arrangement of the belt cord.
Figure 6B:
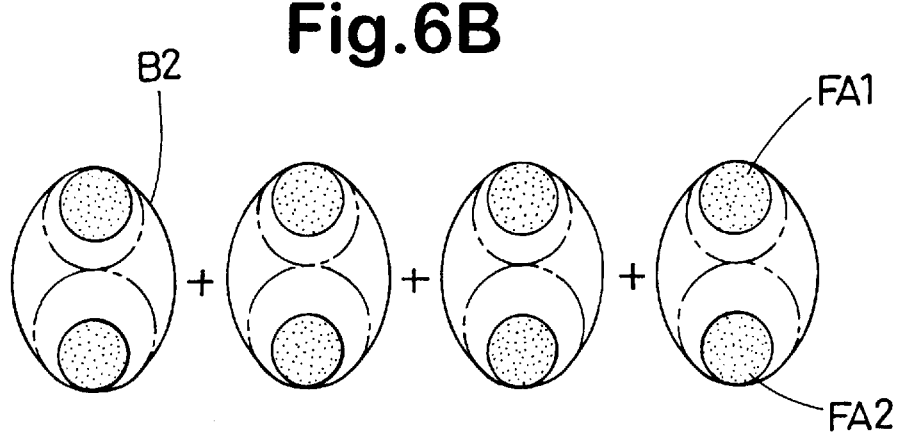
Figure 6C:
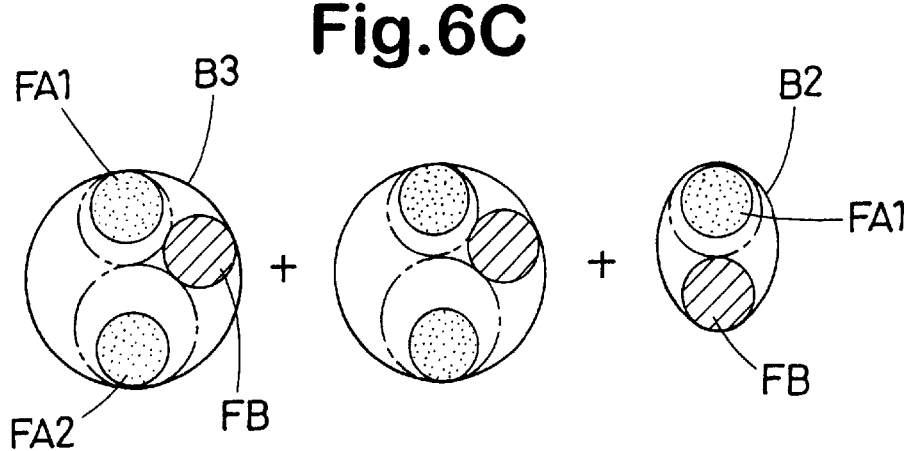

FIGS. 6A to 6C show other examples of the cord composed of eight metallic filaments F like the cord shown in FIG. 5. FIGS. 6A and 6B each show an example formed by twisting four two-filament bunches B2. FIG. 6C shows an example formed by twisting one two-filament bunch B2 and two three-filament bunches B3. In FIGS. 6A and 6C, the two-filament bunch B2 includes one waved filament FA1 or FA2 and one unwaved filament FB. In FIG. 6B, the two-filament bunch B2 includes one waved filament FA1 and one waved filament FA2. In FIG. 6C, the three-filament bunch B3 includes one waved filament FA1, one waved filament FA2 and one unwaved filament FB.

Figure 7A:
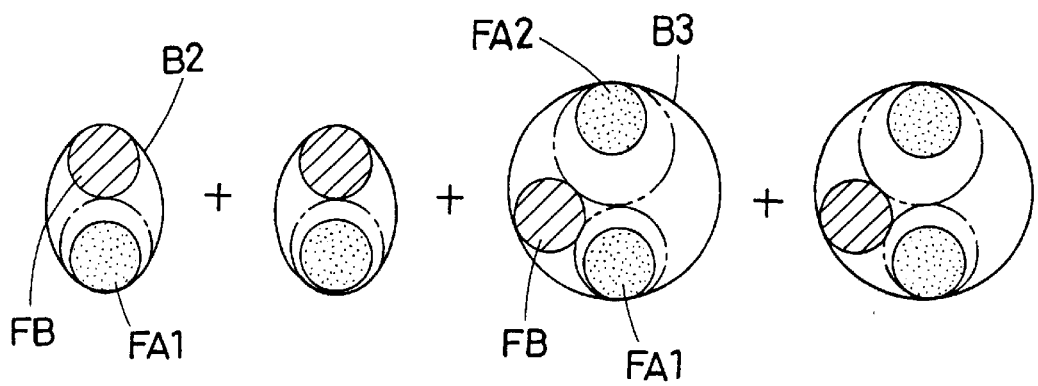
Figure 7B:
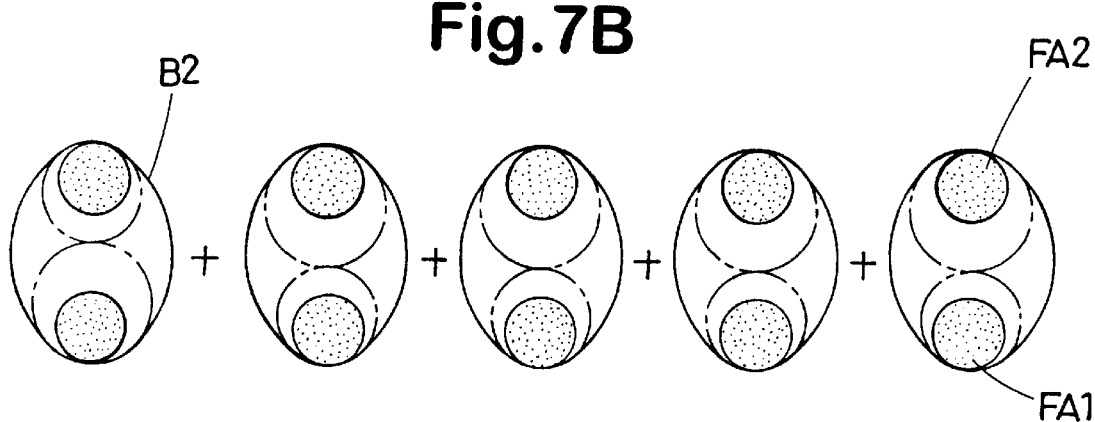

Further, FIGS. 7A and 7B show examples of the cord composed of ten metallic filaments F. FIG. 7A shows an example formed by twisting two two-filament bunches B2 and two three-filament bunches B3. FIG. 7B shows an example formed by twisting five two-filament bunches B2.

Figure 8:
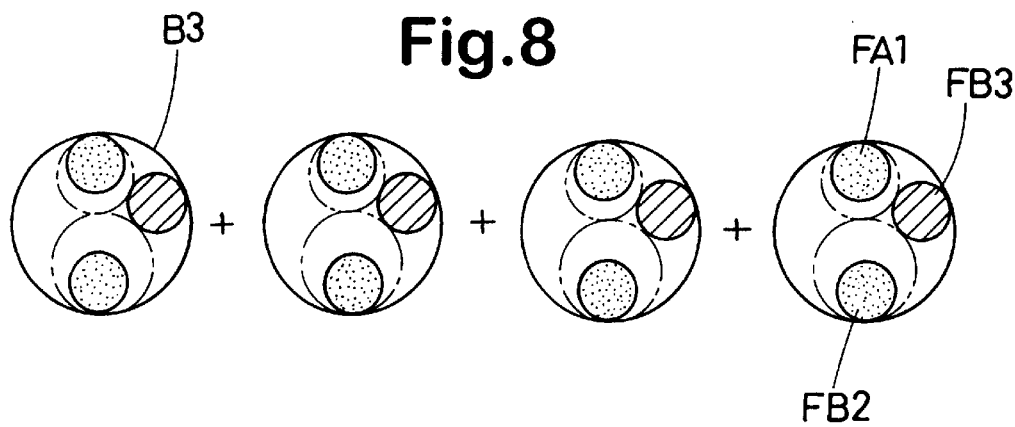

FIG. 8 shows an example cord composed of twelve metallic filaments F, wherein four three-filament bunches B3 are final twisted.

As to the allocation, in number, of the waved filament FA1, FA2 and unwaved filament FB for the two-filament bunch B2, three-filament bunch B3, and a four-filament bunch B4 (not shown), various arrangements is possible aside from those shown in the above-mentioned figures.

It is, however, especially preferable that the metallic cord 10 is formed by twisting at least two three-filament bunches B3, each bunch including three waved filaments FA having different pitches because the coincidence of the waves of the waved filaments FA is prevented and wider gaps 15 can be formed between the filaments to improve the rubber penetration.

In the above-mentioned examples, all the metallic filaments F have the same diameter (d). But, it may be possible to combine filaments having two or more different diameters.

Comparison Tests

Test tires of size 165/70SR13 having the same structure except for the belt cords were made and tested as follows, wherein the carcass was composed of two plies of 1100 dtex/2 polyester cords arranged at 90 degrees with respect to the tire equator at a cord count of 48/5 cm, and the belt was composed of two cross plies of parallel cords laid at +20/−20 degrees with respect to the tire equator at a cord count of 40/5 cm. The belt cord structures are shown in Table 1.

Ride Comfort Test

A passenger car provided on all the wheels with test tires was run on an asphalt road in a tire test course in a speed range of 50 to 100 km/h, and the ride comfort was evaluated by the test driver. The higher the index number, the better the ride comfort.

Rubber Penetration Test

The cord was taken out from the tire together with the surrounding topping rubber, and the topping rubber was carefully removed from the surface of the cord. Then, two adjacent filaments 10 cm in length were removed therefrom using a knife, and the length of a part surrounded by the two removed filaments and the remaining filaments into which the rubber completely penetrated were measured to obtain the percentage of this length to the total length of 10 cm as the rubber penetration %. The penetration % was made on ten positions per tire, and the average thereof was adopted.

Corrosion and Reserved Strength Test

The tire was disassembled after running about 200,000 km, and the steel cords were checked for corrosion. The results are indicated by an index based on Ref.1 being 100. The smaller the index, the smaller the corrosion.

Further, the steel cords were took out and the cord strength was measured. The results are indicated in percentage to the original strength.

Bending Rigidity

The bending rigidity of the test cord was measured with a V-5 stiffness tester model 150-D of Taber Industries, U.S.A. as a force in gram centimeter required to bend the cord 15 degrees.

Figure 9:
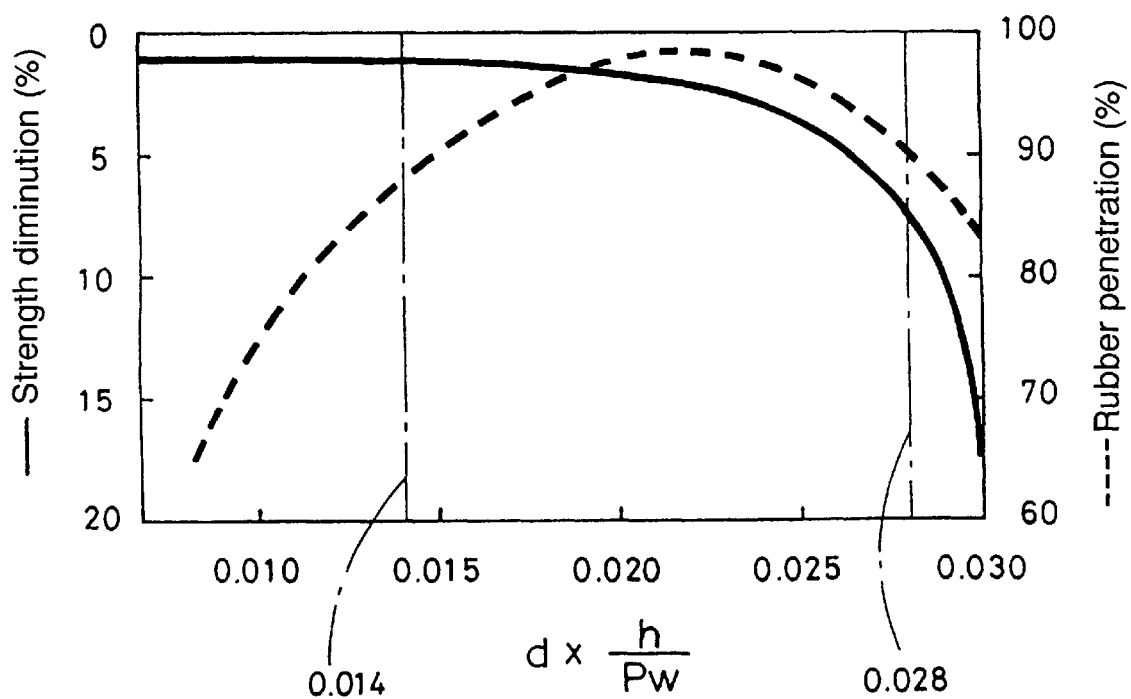
FIG. 9 is a graph showing the cord strength and rubber penetration as a function of a d×h/Pw value.

FIG. 9 shows the cord strength and rubber penetration as a function of the value of d×h/Pw. Here, the cord strength is shown as a diminution in % of the strength of the test cord from that of a standard cord, wherein the standard cord for each test cord is a compact cord that is the same as the test cord in respect of the material, the number of the filaments, the filament diameter, and the final twist pitch, except that all the filaments are unwaved and the first twist pitch is the same as the final twist pitch. Thus, the smaller the value, the higher the strength. As shown in this figure, by setting the d×h/Pw value in a range of 0.014 to 0.028, both of the rubber penetration and the rate of diminution of the cord strength can be maintained in a good level.

From the above-mentioned test results, it was confirmed that the ride comfort can be improved, and at the same time, the resistance to corrision is improved without sacrificing the belt cord strength.

The present invention suitably applied to radial tired for passenger cars. But, it is also possible to apply other types of pneumatic tires.

TABLE 1

| Tire | Ref. 1 | Ref. 2 | Ref. 3 | Ref. 4 | Ex. 1 | Ex. 2 | Ex. 3 | Ex. 4 | Ex. 5 | Ex. 6 |
| --- | --- | --- | --- | --- | --- | --- | --- | --- | --- | --- |
| Cord structure | 1 × 7 × 0.23 | 1 × 7 × 0.35 | 1 × 9 × 0.20 | 1 × 15 × 0.13 | 1 × 7 × 0.23 | 1 × 7 × 0.23 | 1 × 9 × 0.20 | 1 × 9 × 0.20 | 1 × 12 × 0.15 | 1 × 12 × 0.15 |
| Carbon content (%) | 0.82 | 0.82 | 0.82 | 0.82 | 0.82 | 0.82 | 0.82 | 0.82 | 0.82 | 0.82 |
| Final twist pitch Pc (mm) | 0 | 20 | 20 | 20 | 20 | 20 | 18 | 18 | 15 | 15 |
| First twist pitch Pf | 0 | 10XPc | 0 | 10XPc | 10XPc | 10XPc | 10XPc | 10XPc | 10XPc | 10XPc |
| Number of filaments | | | | | | | | | | |
| Bunch 1 | | | | | | | | | | |
| Waved | 0 | 1(A) | 3(A:A:A) | 2(A:A) | 1(A) | 2(A:B) | 1(A) | 2(A:B) | 3(A:A:A) | 2(A:B) |
| Unwaved | 7 | 1 | 6 | 3 | 2 | 0 | 2 | 1 | 0 | 2 |
| Bunch 2 | | | | | | | | | | |
| Waved | — | 1(A) | — | 2(A:A) | 1(A) | 2(A:B) | 1(A) | 2(A:B) | 3(A:A:A) | 2(A:B) |
| Unwaved | — | 1 | — | 3 | 2 | 0 | 2 | 1 | 0 | 2 |
| Bunch 3 | | | | | | | | | | |
| Waved | — | 1(A) | — | 2(A:A) | 1(A) | 3(A:B:B) | 1(A) | 2(A:B) | 3(A:A:A) | 2(A:B) |
| Unwaved | — | 2 | — | 3 | 3 | 1 | 2 | 1 | 0 | 2 |
| Bunch 4 | | | | | | | | | | |
| Waved | — | — | — | — | — | — | — | — | 3(A:A:A) | — |
| Unwaved | — | — | — | — | — | — | — | — | 0 | — |
| Wave | — | A | A | A | A | A:B | A | A:B | A | A:B |
| Pitch Pw (mm) | — | 3.5 | 0.95 | 2 | 3.5 | 3.0:3.5 | 3 | 2.5:3.5 | 2 | 2.0:2.5 |
| Height h (mm) | — | 0.3 | 0.65 | 0.25 | 0.3 | 0.28:0.30 | 0.28 | 0.28:0.30 | 0.25 | 0.20:0.20 |
| d × h/Pw | — | 0.03 | 0.137 | 0.016 | 0.02 | 0.021:0.020 | 0.019 | 0.022:0.017 | 0.019 | 0.015:0.016 |
| Cord characteristics | | | | | | | | | | |
| Cord diameter (mm) | 0.65 | 1.21 | 1.45 | 1.01 | 0.83 | 0.85 | 0.73 | 0.75 | 0.78 | 0.8 |
| Strength (N/mm^2) | 843 | 1932 | 819 | 578 | 823 | 750 | 800 | 747 | 600 | 612 |
| Strength decrease (%) | 0 | 4.3 | 18 | 6.8 | 6.5 | 6 | 2.3 | 6.8 | 7 | 5.5 |
| Elongation (%) @ 50N | 0.043 | 0.05 | 0.08 | 0.07 | 0.055 | 0.199 | 0.05 | 0.08 | 0.211 | 0.071 |
| Bending rigidity (g.cm) | 28 | 144 | 21 | 7 | 28 | 21 | 21 | 18 | 10 | 13 |
| Rubber penetration (%) | 0 | 93 | 95 | 92 | 93 | 98 | 93 | 95 | 96 | 97 |

TABLE 1-continued

| Tire | Ref. 1 | Ref. 2 | Ref. 3 | Ref. 4 | Ex. 1 | Ex. 2 | Ex. 3 | Ex. 4 | Ex. 5 | Ex. 6 |
| --- | --- | --- | --- | --- | --- | --- | --- | --- | --- | --- |
| Tire performance | | | | | | | | | | |
| Ride comfort (index) | 90 | 70 | 86 | 68 | 98 | 100 | 96 | 100 | 92 | 96 |
| Corrosion (index) | 100 | 21 | 15 | 31 | 14 | 9 | 14 | 12 | 15 | 12 |
| Reserved strength (%) | 88 | 96 | 89 | 91 | 96 | 98 | 96 | 95 | 98 | 94 |

What is claimed is:

1. A pneumatic tire, comprising a belt disposed in a tread portion, said belt being made of cords, each cord being made up of six to twelve metallic filaments whose diameter is not less than 0.15 mm but less than 0.25 mm, said six to twelve metallic filaments being grouped into a plurality of bunches, each bunch including two to four of said six to twelve metallic filaments, the two to four filaments being twisted together into the bunch at a first twist pitch, the bunches being twisted together into the cord at a final twist pitch, said final twist pitch being in a range of from 10 to 40 mm, and said first twist pitch being more than the final twist pitch, said six to twelve metallic filaments comprising waved filaments and at least one unwaved filament, each of said waved filaments being two-dimensionally waved at wave pitches in a range of from 5 to 30 times the diameter of the filament and at a wave height in a range of from 0.2 to 3.0 times the diameter of the filament, and each of said bunches including at least two of said waved filaments having different wave pitches.

2. The pneumatic tire according to claim 1, wherein said first twist pitch is in a range of from 3 to 20 times the final twist pitch.

3. The pneumatic tire according to claim 1, wherein each bunch is made up of two or three filaments.

4. The pneumatic tire according to claim 1, wherein said belt comprises at least two cross plies, each ply made of said cords laid parallel with each other at an angle of from 15 to 35 degrees with respect to the tire equator.

5. The pneumatic tire according to claim 1, wherein said belt is disposed radially outside a carcass, the carcass composed of at least one ply of organic fiber cords arranged radially at an angle of from 70 to 90 degrees with respect to the tire equator.

6. The pneumatic tire according to claim 2, wherein each bunch is made up of two or three filaments.

7. The pneumatic tire according to claim 1, wherein the number of said waved filaments in said six to twelve metallic filaments is more than the number of said at least one unwaved filament therein.

8. A pneumatic tire, comprising a belt disposed in a tread portion, said belt being made of cords, each cord being made up of six to twelve metallic filaments whose diameter is not less than 0.15 mm but less than 0.25 mm, said six to twelve metallic filaments being grouped into a plurality of bunches, each bunch including two to four of said six to twelve metallic filaments, the two to four filaments being twisted together into the bunch at a first twist pitch, the bunches being twisted together into the cord at a final twist pitch, said final twist pitch being in a range of from 10 to 40 mm, and said first twist pitch being more than the final twist pitch, said six to twelve metallic filaments comprising waved filaments and at least one unwaved filament, each of said waved filaments being two-dimensionally waved at wave pitches in a range of from 5 to 30 times the diameter of the filament and at a wave height in a range of from 0.2 to 3.0 times the diameter of the filament, and each of said bunches including at least one of said waved filaments, wherein the number of said waved filaments in said six to twelve metallic filaments is more than the number of said at least one unwaved filament therein.

9. The pneumatic tire according to claim 8, wherein said first twist pitch is in a range of from 3 to 20 times the final twist pitch.

10. The pneumatic tire according to claim 8, wherein each bunch is made up of two or three filaments.

11. The pneumatic tire according to claim 8, wherein each of said bunches included two waved filaments having different waved pitches.

12. The pneumatic tire according to claim 8, wherein said belt comprises at least two cross plies, each ply made of said cords laid parallel with each other at an angle of from 15 to 35 degrees with respect to the tire equator.

13. The pneumatic tire according to claim 8, wherein said belt is disposed radially outside a carcass, the carcass composed of at least one ply of organic fiber cords arranged radially at an angle of from 70 to 90 degrees with respect to the tire equator.

14. The pneumatic tire according to claim 9, wherein each bunch is made up of two or three filaments.

* * * * *